July 10, 1923.

C. L. A. M. LEBLANC

COMMUTATING SYSTEM FOR ELECTRICAL MACHINES

Filed Sept. 15, 1920

INVENTOR
Charles L. A. M. Leblanc
by Grunt McCullister

July 10, 1923.

C. L. A. M. LEBLANC 1,461,446

COMMUTATING SYSTEM FOR ELECTRICAL MACHINES

Filed Sept. 15, 1920    2 Sheets-Sheet 2

INVENTOR

Patented July 10, 1923.

1,461,446

UNITED STATES PATENT OFFICE.

CHARLES LÉONARD ARMAND MAURICE LEBLANC, OF PARIS, FRANCE, ASSIGNOR TO SOCIETE ANONYME POUR L'EXPLOITATION DES PROCEDES MAURICE LEBLANC-VICKERS, OF PARIS, FRANCE.

COMMUTATING SYSTEM FOR ELECTRICAL MACHINES.

Application filed September 15, 1920. Serial No. 410,534.

*To all whom it may concern:*

Be it known that I, CHARLES LÉONARD ARMAND MAURICE LEBLANC, a citizen of the Republic of France, residing at 1 Boulevard de Montmorency, Paris, Seine, France, have invented certain new and useful Improvements in Commutating Systems for Electrical Machines; and I do hereby declare the following to be a full, clear, and exact description of the invention, such as will enable others skilled in the art to which it appertains to make and use the same, reference being had to the accompanying drawings and to letters or figures of reference marked thereon, which form a part of this specification.

The earliest electrical machines having commutators were provided with metallic brushes but in general the commutation will be improved by substituting carbon brushes.

The improvement in commutation is due to the fact that the contact resistance of carbon is much higher than that of copper so that when a brush simultaneously engages two consecutive segments of the commutator and thus short-circuits a coil of the armature, the strength of the short-circuit current will be reduced as the resistance of the conductor which constitutes the short-circuit is increased.

This advantage is, however, only obtained at the price of a considerable increase in the dimensions of the brushes and of the commutator; in fact the energy dissipated at the time of the short-circuit is transformed into heat in that part of the brush which is in contact with the commutator. Now graphite, a poorer conductor of electricity than copper is also a poorer conductor of heat; it follows therefore that the heat developed at the end of a graphite brush is less rapidly dissipated throughout the whole of its mass than is the case with a copper brush, consequently to prevent a dangerous heating of the surface of the conductors and brushes only current densities of about one-third of those in copper brushes can be tolerated in carbon brushes.

The object of the present invention is to construct an improved type of commutator and a system of brushes by means of which the short-circuit current can be reduced to such an amount as may be desired and also the bulk of the energy of the short-circuit current dissipated in the form of heat at a distance from the commutator.

In the accompanying drawings Fig. 1 illustrates diagrammatically a part of a commutator embodying the invention developed into a plane.

Figure 1:
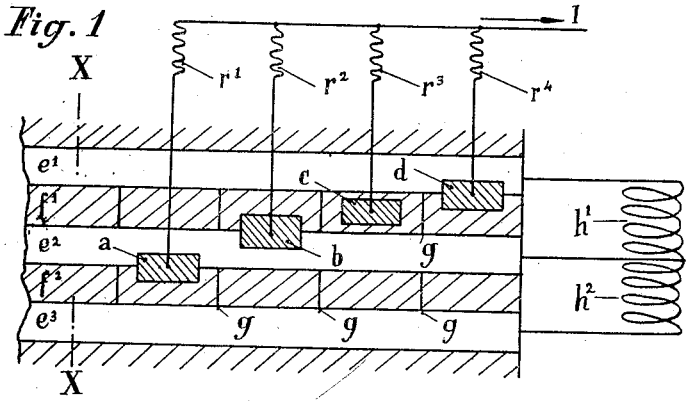

Referring now to Fig. 1, the successive commutator segments are represented by the strips $e^1$, $f^1$, $e^2$, $f^2$, etc. Each brush is divided into a series of elements $a$, $b$, $c$, $d$, etc., which are connected to the main current lead through resistances $r^1$, $r^2$, $r^3$, $r^4$, respectively and are staggered in the direction of rotation. As two consecutive segments of the commutator ought not to be able to be short-circuited by a single element of the brush, the space which separates them ought to be wider than this element. In such a commutator the insulating segments would be almost as wide as the conducting segments which would result in a poor mechanical construction.

It would also be impossible to rotate such a commutator at high speed by reason of the centrifugal force.

In the present invention this difficulty is avoided by constructing the commutator with segments separated as usual by thin insulation, but in which only alternate segments such as $e^1$, $e^2$, $e^3$, are made use of; the other segments $f^1$, $f^2$ not being connected to the armature and each of the segments being wider than a brush element. To prevent the intermediate conducting segments such as $f^1$ from short-circuiting the resistances $r^1$, $r^2$, $r^3$, $r^4$ when two elements of the brush occupy respectively positions such as indicated at $b$, $d$ for example, these segments are divided as shewn at $g$ and the sections thus formed are insulated from one another. With this construction with the element $d$ in contact with the segment $e^1$ and the element $a$ with the segment $e^2$ as shewn, the coil $h^1$ will be connected across the two resistances $r^1$ and $r^4$ and the short-circuit current will depend on the amount of these resistances, furthermore, substantially all the heat liberated will be in these resistances which can obviously be located as far from the commutator as desired.

It will evidently be desirable to make these resistances large to ensure good commutation but as they are traversed by the main current I, a loss of energy results which ought to be small so as not to diminish too much the output of the machine and consequently the resistances will be designed to reduce this loss as much as possible consistent with the other objects in view.

In any case as good commutation as may be desired can be obtained at the cost of a small expenditure of energy by regulating the size of the resistances.

Figures 7, 8:
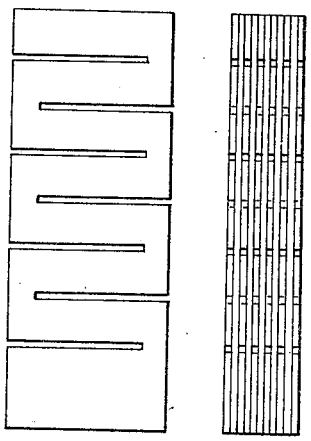
Fig. 7 is a face view and Fig. 8 an edge view of an improved brush constructed according to the present invention.

A simple method of constructing the brushes consists in forming them of a bundle of thin metallic plates insulated from one another either by a layer of insulating varnish such as cellulose acetate or by the interposition of a segment of insulating material such as mica or by a layer of oxide formed on the surface of the metal as in the case of aluminium or of duralumin. The upper portions of the plates are slit or slotted in a well known manner as shewn in Figs. 7 and 8 so as to form a resistance of which the amount depends on the number of slots made in the plate.

The latter can moreover, if necessary, be made of a high resistance alloy such as ferro-nickel.

Figure 2:
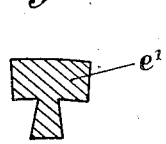
Fig. 2 is a section of one of the commutator segments.

The division of the intermediate segments as above described is not practicable with the ordinary construction of commutator in which the segments are only held by ring or binding at their ends. According to the invention, therefore, these segments are secured to the supporting bush throughout their whole length by providing at their lower part a dove-tail extension as shewn in section in Fig. 2, this extension being received in an insulated groove of corresponding form provided in the supporting bush $s$.

Figure 3:
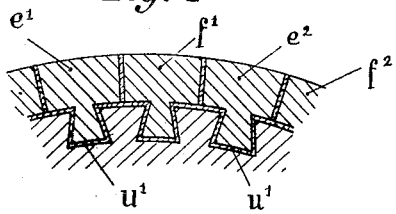
Fig. 3 is a section of a part of the commutator on the line X—X, Fig. 1.

Fig. 3 clearly shews this method of construction, the insulation being indicated at $u^1$.

Figure 4:
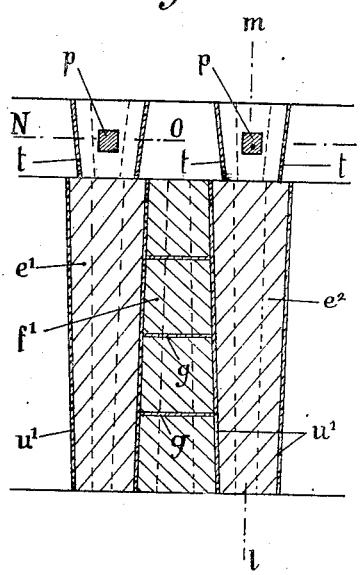
Fig. 4 is a diagrammatic view similar to Fig. 1 illustrating a modification.

It is necessary to take special precautions to avoid chafing the insulation when sliding the dove-tail into its groove. For this purpose the commutator segments and dove-tails may be made of a trapezoidal section in plan as clearly shewn in Fig. 4.

The segments of the commutator can then be first arranged in the desired manner without endangering the insulation and definitely secured in their final position by forcing them through only a small distance relatively to the bush.

Figure 5:
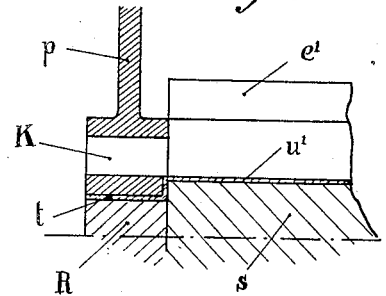
Fig. 5 is a section on the line $l$, $m$, Fig. 4.
Figure 6:
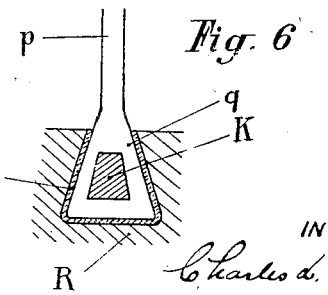
Fig. 6 is a section on the line N, O, Fig. 4.

In the case of high speed electrical machines the bars or strips which connect the commutator segments to the windings must be secured in such a manner as to resist centrifugal forces, particularly if these segments and connections are of aluminium or duralumin as in such cases the strength of the soldered joints cannot be relied upon. For this purpose each segment which is to be connected is provided with an extension in the form of a dove-tail K, (see Figs. 4, 5 and 6). The connecting bar or strip $p$ is terminated by stirrup $q$ pierced by a hole into which the dove-tail extension $p$ is forcibly pressed and then soldered. This stirrup $q$ is itself formed in a dove-tail shape externally and is received in an insulated recess of the same shape formed in a metallic disc R mounted on the shaft and in contact with the commutator bush $s$. This stirrup is wide enough for the tension exerted by centrifugal force on the bar $p$ and which is transmitted to it, to be spread over a sufficiently large surface so that the insulation $t$ will not be crushed between the stirrup and the wall of the recess.

The mounting of the commutator is effected without difficulty because the recesses provided in the disc R for the stirrups K permit of the easy passage of the dove-tails of the segments which are smaller in cross-section.

It may be objected that with this construction only one-half of the surface of the commutator is employed, but the total surface necessary will still be less than in other constructions since in this case there will be the advantage of using metallic brushes instead of carbon brushes.

The present invention which can be used in all cases is especially applicable to the case of electrical machines having very high rotational speeds.

In practice, in order that the commutator segments shall be able to resist the centrifugal force and nothwithstanding that the problem is simplified by the substitution of duralumin for copper in the manufacture of the commutator segments, the commutator can only be given a small dimension. The result is that if the normal number of segments are provided these must be very narrow and their manufacture difficult, in order, therefore, to obtain a practicable construction the number of segments is diminished and consequently the difference of potential between two adjacent segments is increased. In this case the difficulties of commutation are such that they cannot be overcome when using brushes of the ordinary type.

It is obvious that the present invention is not limited only to the combination of the commutator and brush system which has been described above but that it also extends to each of these two parts taken separately.

What I claim is:

1. A commutating device comprising, a commutator cylinder provided with a plurality of commutator segments, a plurality of low resistance brush elements electrically connected together and arranged in circumferential stepped relation with respect to each other for cooperation with said cylinder and each of said brush elements having a resistance in series therewith, alternate segments of said cylinder being connected to the armature windings of the machine and the intermediate segments each being inactive and divided into a plurality of sections which are insulated from each other and from said alternate segments, each of said sections being disposed in the path of one of said brush elements, whereby the individual brush elements are insulated from each other at the commutator, but electrically connected through said resistances.

2. A commutator comprising alternate segments adapted for connection to an armature winding, intermediate segments each divided into several insulated sections by slots perpendicular to the axis of the commutator and a supporting brush to which all the segments are secured by longitudinal dove-tails which together with the segments are trapezoidal in section substantially as and for the purpose specified.

3. A commutator cylinder comprising, a bushing, a plurality of commutator segments carried thereby, a plurality of connectors for certain of said segments adapted to be connected to the armature windings of the machine, each of said connectors being provided with an eye portion adapted to embrace a projection carried by a segment, and a disk mounted adjacent to the end of said bushing and having a plurality of recesses therein adapted to receive the eye portions of said conductors to maintain them against radial displacement.

4. An electrical connection between a commutator segment and the terminal of an armature coil consisting of a bar or strip terminated by a stirrup-shaped piece having an orifice adapted to receive an extension of a commutator segment and a disc mounted adjacent to the end of the commutator, said disc having a dove-tail recess in which the stirrup-shaped piece is located.

5. A commutator cylinder comprising a bushing provided with a plurality of longitudinally extending dove-tail slots in the periphery thereof, alternate slots being tapered in one direction and the intermediate slots being tapered in the opposite direction and a plurality of oppositely tapered commutator segments provided with tapered dove-tail projections for cooperative engagement with said slots, adjacent segments being adapted to be slid into position in wedging engagement with each other from opposite directions.

In testimony that I claim the foregoing as my invention, I have signed my name.

CHARLES LÉONARD ARMAND MAURICE LEBLANC.

Witness:
PETER PETERSEN.